United States Patent [19]

Ishikawa et al.

[11] 4,267,560
[45] May 12, 1981

[54] COLOR TELEVISION RECEIVER FOR SIMULTANEOUS DISPLAY OF PLURAL PROGRAMS

[75] Inventors: Toshiro Ishikawa, Hirakata; Teruo Kitani, Takatsuki; Takaaki Baba, Nishinomiya, all of Japan

[73] Assignee: Matsushita Electric Industrial Co., Ltd., Osaka, Japan

[21] Appl. No.: 974,548

[22] Filed: Dec. 29, 1978

[30] Foreign Application Priority Data

Dec. 29, 1977 [JP] Japan .................................. 52-157701

[51] Int. Cl.³ ............................................. H04N 9/535
[52] U.S. Cl. ...................................................... 358/22
[58] Field of Search ................................. 358/22, 13, 12

[56] References Cited

U.S. PATENT DOCUMENTS

| | | | |
|---|---|---|---|
| 3,778,542 | 12/1973 | Hanseman | 358/22 |
| 4,054,904 | 10/1977 | Saitoh | 358/13 |
| 4,063,280 | 12/1977 | Hattori | 358/22 |
| 4,139,860 | 2/1979 | Micic | 358/22 |
| 4,152,719 | 5/1979 | Kellar | 358/22 |

FOREIGN PATENT DOCUMENTS 1503612  3/1978  United Kingdom ...................... 358/22

*Primary Examiner*—Robert L. Griffin
*Assistant Examiner*—Michael A. Masinick

*Attorney, Agent, or Firm*—Stevens, Davis, Miller & Mosher

[57] ABSTRACT

A color television receiver receiving two television signals of different channels, compressing the time axis of one of the television signals, and inserting this compressed television signal in a portion of the other television signal for displaying the pictures of the two channels on the same screen. In the receiver, the luminance signal, chrominance signal and synchronizing signal are derived from each of the received two television signals. A writing clock pulse signal is produced on the basis of one of the synchronizing signals for writing the luminance signal and chrominance signal in the corresponding television signal in a memory circuit, while a reading clock pulse signal is produced on the basis of the other synchronizing signal to read out the luminance signal and chrominance signal from the memory circuit in a relation in which these signals are compressed in the time axis. After the luminance signal and chrominance signal read out from the memory circuit are adjusted in their signal levels relative to the luminance signal and chrominance signal in the other television signal, a portion of the luminance signal and chrominance signal in the other television signal is replaced by the luminance signal and chrominance signal read out from the memory circuit so that the pictures of the two channels can be displayed on the same screen.

9 Claims, 9 Drawing Figures

COLOR TELEVISION RECEIVER FOR SIMULTANEOUS DISPLAY OF PLURAL PROGRAMS

BACKGROUND OF THE INVENTION

This invention relates to a television receiver capable of simultaneously displaying color pictures of two channels on a single screen thereof.

Japanese Patent Application Kokai (Laid-Open) No. 49-2419 discloses a method of simultaneously displaying pictures of two channels A and B on the same screen of a television receiver. For a better understanding of the present invention, the disclosure of the cited patent application will be described with reference to FIGS. 1 and 2 before describing the present invention in detail.

Figure 1:
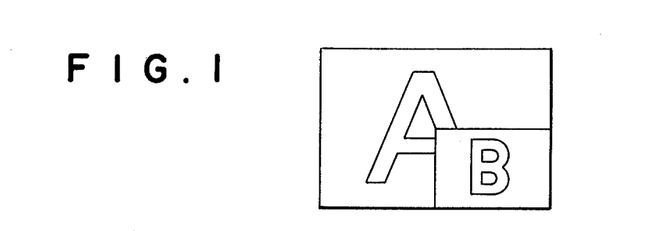
FIG. 1 illustrates an example of the display pattern on the screen of a color television receiver to which the present invention is applied.

Referring to FIG. 1, the picture of the channel B occupies approximately the quarter of the total area of the screen with a height and a width which are approximately the half of those of the screen, and is displayed on the lower right corner portion of the screen. According to the basic principle of the method disclosed in the cited patent application, alternate ones of picture elements (sampling points required for picture reproduction) in alternate scanning periods for the channel B are sampled to be stored in a memory circuit, and during scanning on the screen portion B in FIG. 1 by the horizontal scanning lines for the channel A, the sampled values stored in the memory circuit are read out at a rate two times the rate of writing so that the picture of the channel B can be displayed on the screen portion B in FIG. 1 in a relation in which it is compressed approximately to the half in both the height and the width.

Figure 2:
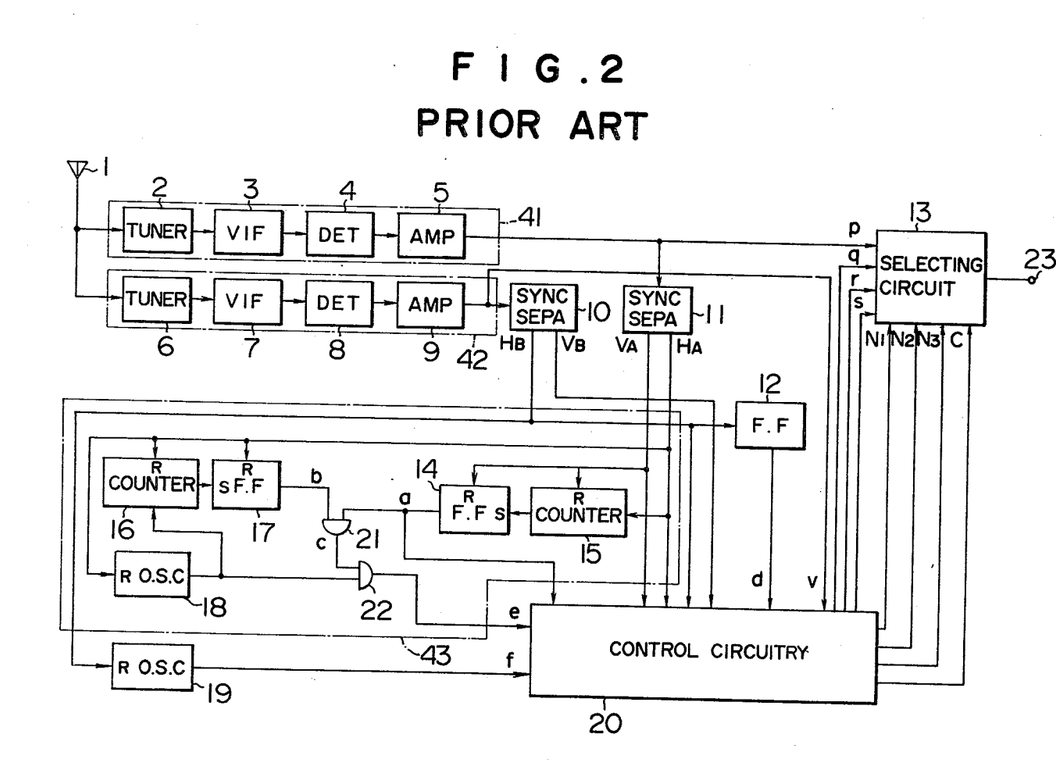
FIG. 2 is a block diagram showing the structure of a prior art color television receiver for displaying the pictures of the two channels according to the display pattern shown in FIG. 1.

FIG. 2 shows the practical structure of the system employed in the aforesaid patent application. The system comprises an antenna 1, tuners 2 and 6 receiving two color television signals of different channels A and B respectively, video intermediate frequency amplifiers 3 and 7, video detectors 4 and 8, video amplifiers 5 and 9, a synchronizing signal separator 10 separating the vertical synchronizing signal $V_B$ and horizontal synchronizing signal $H_B$ of the channel B from the output of the video amplifier 9, and another synchronizing signal separator 11 separating the vertical synchronizing signal $V_A$ and horizontal synchronizing signal $H_B$ of the channel A from the output of the video amplifier 5. A flip-flop 12 is inverted in its state in response to the application of the horizontal synchronizing signal $H_B$, and an output signal d appears from the flip-flop 12. An input p representing the video signal of the channel A is directly applied from the video amplifier 5 to a signal selecting circuit 13 together with inputs q, r and s applied from a memory circuit (not shown) which stores alternately the video signal portions of the channel B. Selection control signals $N_0$, $N_1$, $N_2$ and $N_3$ are applied to the signal selecting circuit 13 from a control circuitry 20, and this circuit 13 selects one of the input signals p, q, r and s, so that a corresponding output signal appears at its output terminal 23. RS flip-flops 14 and 17 each having a reset terminal R and a set terminal S generate an output a and an output b respectively. Counters 15 and 16 are connected at their output terminals to the set terminals of the RS flip-flops 14 and 17 respectively. A gated oscillator 18 is reset or ceases to oscillate each time the horizontal synchronizing signal $H_A$ appears from the synchronizing signal separator 11 so that the phase of the first pulse of its output pulse signal relative to the horizontal synchronizing signal $H_A$ can be maintained constant during each horizontal scanning period. Another gated oscillator 19 generating an output pulse signal f has a similar relationship with respect to the horizontal synchronizing signal $H_B$. The control circuitry 20 includes the memory circuit consisting of three analog memories of CCD or BBD structure and storing picture information written therein to be read out therefrom. The outputs a and b of the respective RS flip-flops 14 and 17 are connected to an AND gate 21 which generates an output c applied to another AND gate 22 together with the output of the gated oscillator 18.

The oscillation frequency of the first gated oscillator 18 is 450 $f_H$ [Hz] when the number of picture elements in one horizontal scanning period is 450 and the horizontal scanning frequency is $f_H$. The oscillation frequency of the second gated oscillator 19 is 225 $f_H$ [Hz] which is the half of that of the first gated oscillator 18. The first counter 15 has a capacity for counting $525/2 \times 2 \rightleftarrows 132$ bits where 525/2 is the number of horizontal scanning lines for one field. Thus, this counter 15 sets the RS flip-flop 14 when it has counted 132 pulses of the horizontal synchronizing signal $H_A$, and an output a of high level appears from the flip-flop 14. This first counter 15 and the flip-flop 14 are reset by the vertical synchronizing signal $V_A$. The second counter 16 has a capacity for counting 450/2=225 bits where 450 is the number of picture elements in one horizontal scanning period. This counter 16 sets the RS flip-flop 17 when it has counted 225 output pulses of the first gated oscillator 18, and an output b of high level appears from the flip-flop 17. The second counter 16 and the flip-flop 17 are reset by the horizontal synchronizing signal $H_A$. Thus, during scanning on the screen portion B shown in FIG. 1, the outputs a and b of high level appear from the respective flip-flops 14 and 17, and the output of the first gated oscillator 18 appears as an output e of the AND gate 22.

Figure 3A:
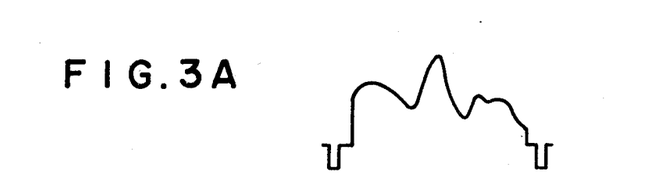
FIGS. 3A, 3B, 3C and 3D are waveform diagrams illustrating the operation of the television receiver shown in FIG. 2.
Figure 3B:
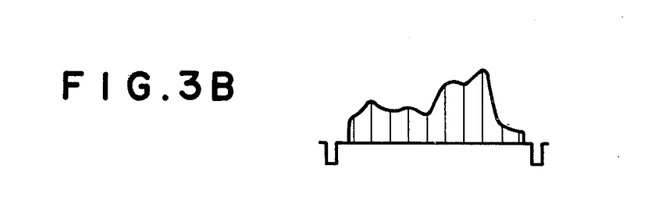
Figure 3C:
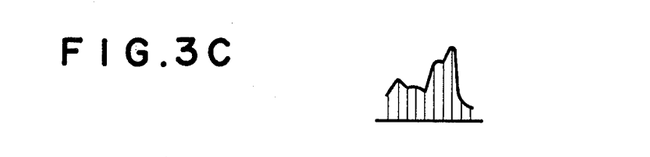
Figure 3D:
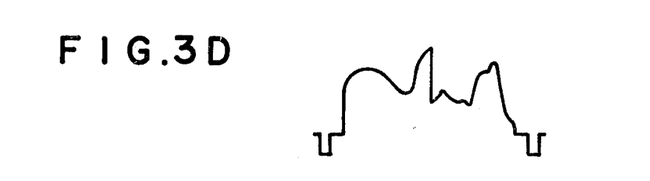

In the system having the structure shown in FIG. 2, a transmitted television signal of the channel A as shown in FIG. 3A is selected by the tuner 2 and is then passed through the video intermediate frequency amplifier 3, video detector 4 and video amplifier 5 to be applied to the signal selecting circuit 13 as a video signal p. Another transmitted television signal of the channel B is selected by the tuner 6 and is then passed through the video intermediate frequency amplifier 7, video detector 8 and video amplifier 9 to be applied to the control circuit 20 as a video signal v. The control circuitry 20 includes three analog memories of CCD or BBD structure and control circuit for alternately actuating these memories. In this control circuitry 20, the video signal v of the channel B is sampled in a manner as shown in FIG. 3B, and the sampled signal portions of successive fields are stored in different ones of these analog memories respectively. After the analog memories have completed the writing, the stored signal portions are successively read out at a rate two times the rate of sampling, so that a video signal as shown in FIG. 3C is obtained in which the time axis is compressed to the half of the original time axis. Video signals q, r and s appear for the successive fields respectively. The video signals p, q, r and s are suitably selected by the signal selecting circuit 13 so that a video signal waveform as shown in FIG. 3D appears at the output terminal 23 of the signal selecting circuit 13. It will be seen from FIG. 3D that the video signal of the channel A and the video signal of the channel B are combined in the output of the circuit 13 to display the pictures of the two channels in accordance with the display pattern shown in FIG. 1.

SUMMARY OF THE INVENTION

It is a primary object of the present invention to provide a color television receiver which is also based upon the principle described hereinbefore so as to display the pictures of the main channel A and subchannel B on the same screen with natural colors.

The color television receiver according to the present invention which attains the above object is featured by the fact that, instead of directly storing the detected video signal of the subchannel B in a memory circuit, the luminance signal and chrominance signal separated from the video signal and then demodulated are stored in separate memory means respectively so that the video signal of the subchannel B can be stored in analog memories of BBD or CCD structure without detracting from the quality of the reproduced colour image of the subchannel B.

In a preferred embodiment of the present invention, the chrominance signal of the subchannel B is converted into two line sequential color difference signals to be written in a memory circuit, and during reading out the line sequential color difference signals from the memory circuit, a delay element providing a time delay corresponding to one horizontal scanning period is used so that these signals can appear simultaneously to thereby reduce the memory capacity. The control circuit is inserted in the subchannel signal system so as to adjust the relative DC levels and amplitudes of the luminance signals and chrominance signals of the main channel A and subchannel B.

DESCRIPTION OF THE PREFERRED EMBODIMENTS

Figure 4:
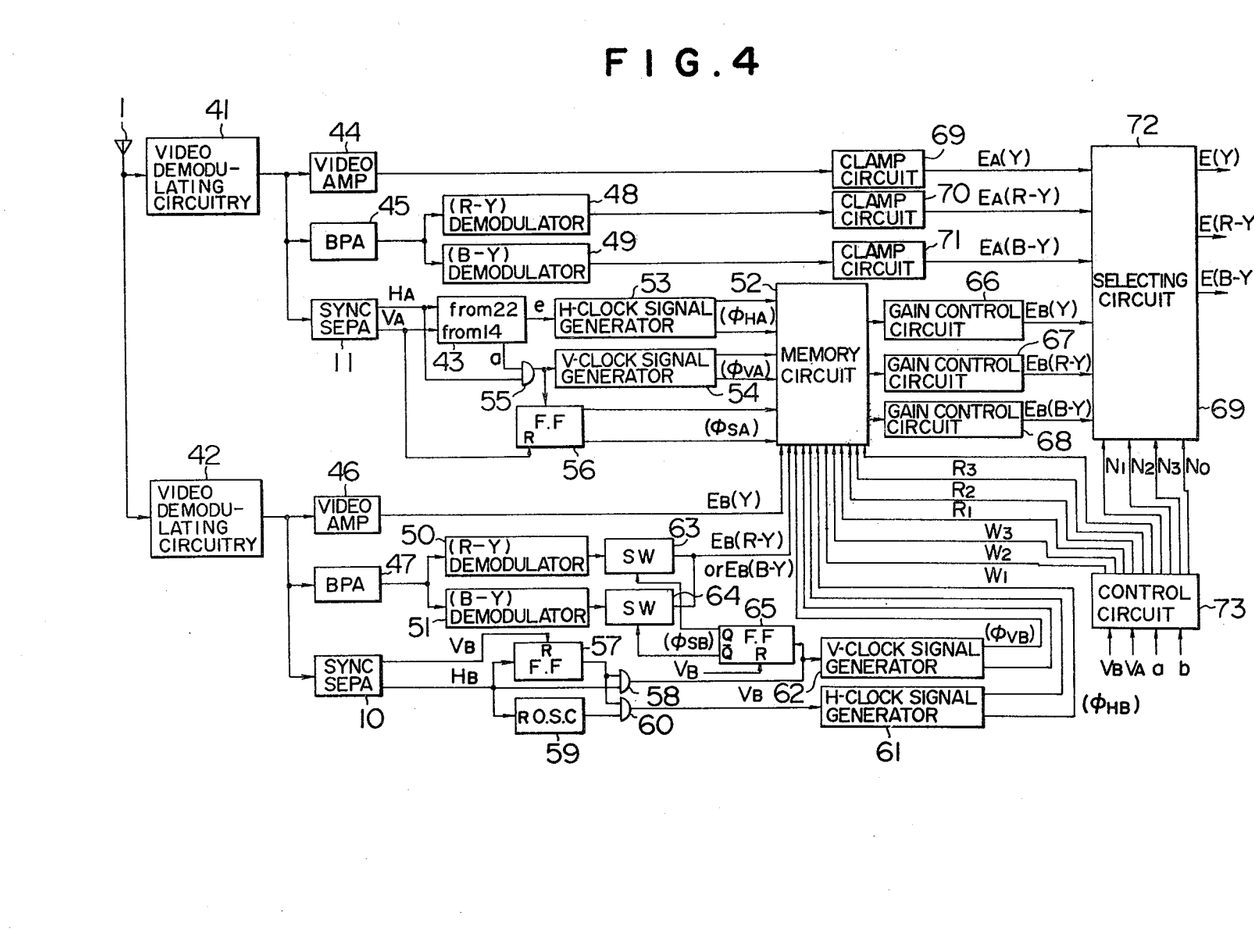
FIG. 4 is a block diagram showing the structure of a preferred embodiment of the color television receiver according to the present invention.
Figure 5:
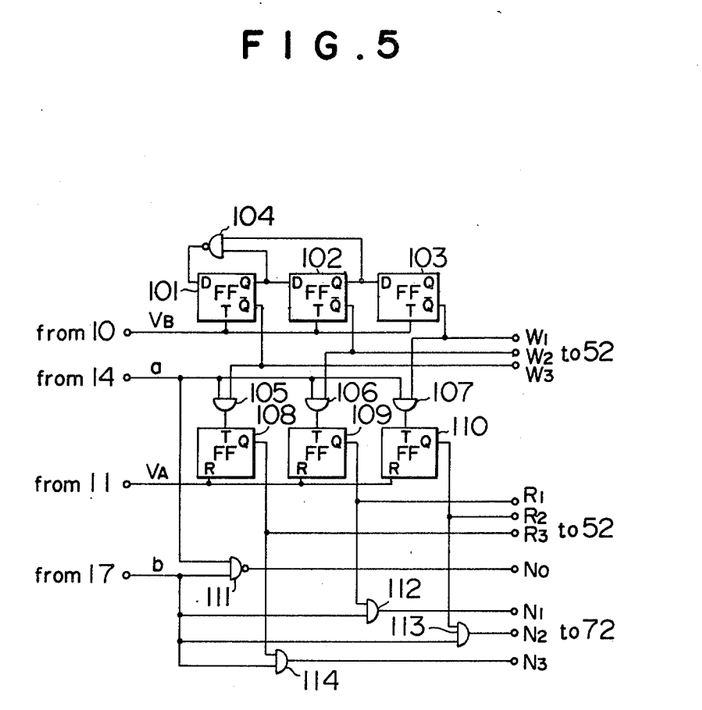
FIG. 5 is a block diagram showing the structure of the control circuit 73 in FIG. 4.
Figure 6:
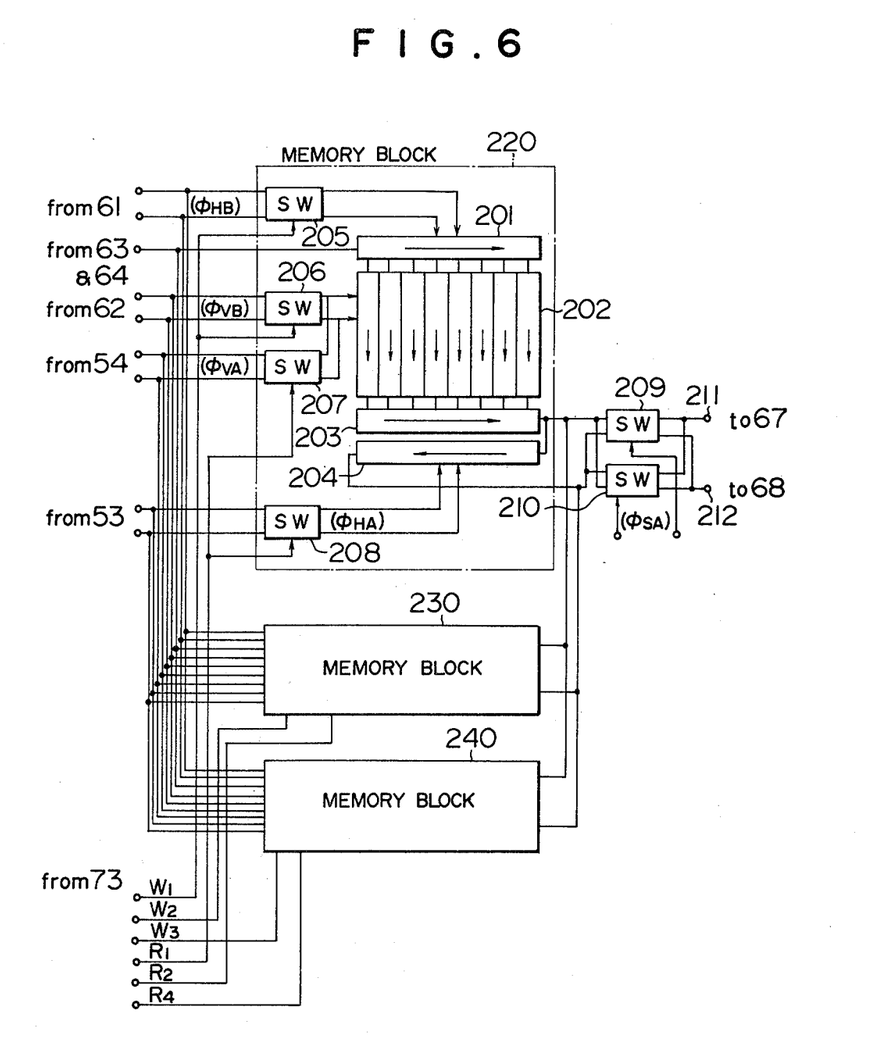
FIG. 6 is a block diagram showing the structure of the memory circuit 52 in FIG. 4.

FIGS. 4 to 6 show a preferred embodiment of the color television receiver according to the present invention which displays the pictures of two channels in a manner as shown in FIG. 1 and operates to provide video signal waveforms as shown in FIG. 3. In FIGS. 4 to 6, the same reference numerals are used to denote the same parts appearing in FIG. 2.

Referring to FIG. 4, video demodulating circuits 41 and 42 include the tuners 2 and 6, video intermediate frequency amplifiers 3 and 7, video detectors 4 and 8, and video amplifiers 5 and 9 respectively shown in FIG. 2. The outputs of video demodulating circuits 41 and 42 are applied to video amplifiers 44 and 46, band-pass amplifiers 45 and 47, and synchronizing signal separators 10 and 11 respectively. From the chrominance signal outputs of the band-pass amplifiers 45 and 47, the burst signals are derived to provide the subcarriers which are demodulated by (R-Y) signal demodulators 48 and 50 and by (B-Y) signal demodulators 49 and 51 to provide the (R-Y) color difference signals and (B-Y) color difference signals of the main channel A and subchannel B respectively. A video demodulating circuitry 43 includes the blocks 14 to 19, 21 and 22 in FIG. 2, and these blocks are the same in structure as those shown in FIG. 2.

A memory circuit 52 includes analog memories of BBD or CCD structure similar to those included in the control circuit 20 shown in FIG. 2. For example, the memory circuit 52 includes three pairs of S-P-S analog memories storing the luminance signal and demodulated color difference signals. The output e of the AND gate 22 is applied to a horizontal clock generator 53 which generates a horizontal transfer clock pulse signal $\phi_{HA}$ which is required for reading out information from a horizontal shift register in the memory circuit 52 and which is used as a signal sampling pulse signal. The horizontal synchronizing signal $H_A$ of the channel A and the output a of the RS flip-flop 14 are applied to an AND gate 55 connected to a vertical clock pulse generator 54 which generates a vertical transfer clock pulse signal $\phi_{VA}$ which is used as a gate pulse signal for parallel writing of information from the horizontal shift register into a vertical shift register in the memory circuit 52. A flip-flop 56 is reset by the vertical synchronizing signal $V_A$ of the channel A and is inverted to generate an output $\phi_{SA}$ each time the output of the AND gate 55 is applied in response to the application of the horizontal synchronizing signal $H_A$. This flip-flop 56 is provided so that the (R-Y) and (B-Y) color difference signals of the channel B stored in a line sequential alternate mode in the memory circuit 52 can be individually separated from the output of the memory circuit 52 by the output $\phi_{SA}$ of the flip-flop 56.

A flip-flop 57 is reset by the vertical synchronizing signal $V_B$ of the channel B and is set by the horizontal synchronizing signal $H_B$ of the channel B appearing from the synchronizing signal separator 10. The output of this flip-flop 57 and the horizontal synchronizing signal $H_B$ are applied to an AND gate 58 so that the horizontal synchronizing signal $H_B$ appears from the AND gate 58 in alternate horizontal scanning periods. A gated oscillator 59 is the same as the gated oscillator 19 shown in FIG. 2 and is reset by the horizontal synchronizing signal $H_B$ applied from the synchronizing signal separator 10. The oscillation output of the gated oscillator 59 is applied to an AND gate 60 together with the output of the flip-flop 57, and a horizontal writing clock pulse signal appears from the AND gate 60 in alternate horizontal scanning periods. The output of the AND gate 60 is applied to a horizontal clock signal generator 61 which generates a horizontal transfer clock pulse signal $\phi_{HB}$ which actuates a horizontal shift register in the memory circuit 52 and which is used as a signal sampling pulse signal. The output of the AND gate 58 is applied to a vertical clock signal generator 62 which generates a vertical transfer clock pulse signal $\phi_{VB}$ which is used as a gate pulse signal for parallel writing of information from the horizontal shift register into the vertical shift register in the memory circuit 52.

The luminance signal $E_B(Y)$ appearing from the video amplifier 46 is directly applied to the memory circuit 52. On the other hand, the demodulated color difference signals $E_B(R-Y)$ and $E_B(B-Y)$ appearing from the (R-Y) demodulator 50 and (B-Y) demodulator 51 are applied to switching circuits 63 and 64 respectively. A flip-flop 65 applies a switching signal $\phi_{SB}$ alternately to the switching circuits 63 and 64 by being inverted in its state in response to the application of the horizontal synchronizing signal $H_B$ from the AND gate 58, so that the color difference signals $E_B(R-Y)$ and $E_B(B-Y)$ are sequentially applied to the memory circuit 52 at time intervals of two horizontal scanning periods. The luminance signal $E_B(Y)$ and color difference signals $E_B(R-Y)$ and $E_B(B-Y)$ of the channel B read out from the memory circuit 52 are applied to gain control circuits 66, 67 and 68 respectively to be maintained at a predetermined DC level and to be adjusted in amplitude. On the other hand, the luminance signal $E_A(Y)$ and color difference signals $E_A(R-Y)$ and $E_A(B-Y)$ of the channel A are applied to clamping circuits 69, 70 and 71 respectively to be clamped at a predetermined DC level, and are then applied to a signal selecting circuit 72 together with the luminance signal $E_B(Y)$ and color difference signals $E_B(R-Y)$ and $E_B(B-Y)$ of the channel B. The signal selecting circuit 72 operates in a manner similar to the signal selecting circuit 13 shown in FIG. 2. Thus, when the selection control signals $N_0$, $N_1$, $N_2$ and $N_3$ are applied from a control circuit 73, the signal selecting circuit 72 switches the video signals of the channels A and B so that the color picture of the channel B can be displayed on a portion of the screen of the television receiver. The control circuit 73 includes a control signal generating section for controlling writing and reading of information in and out of the analog memories in the memory circuit 52.

FIG. 5 shows the structure of the control circuit 73. Referring to FIG. 5, 0 flip-flops 101, 102 and 103 constitute a ring counter together with a NAND gate 104. The vertical synchronizing signal $V_B$ of the channel B is applied from the synchronizing signal separator 10 as a trigger signal for triggering the flip-flops 101 to 103, and the outputs appearing at the output terminals Q of the flip-flops 101 and 102 are applied to the D terminals of the flip-flops 102 and 103 respectively and also to the two input terminals of the NAND gate 104. The output of the NAND gate 104 is applied to the D terminal of the flip-flop 101 so that writing control signals $W_1$, $W_2$ and $W_3$ appear at the inverted output terminals $\overline{Q}$ of the flip-flops 103, 102 and 101 respectively. Consequently, an output mode is obtained in which the writing control signals $W_1$, $W_2$ and $W_3$ take sequentially the states (1, 0, 0), (0, 1, 0) and (0, 0, 1), and such states appear repeatedly in the above sequential order. The writing control signals $W_1$, $W_2$ and $W_3$ having such an output mode are applied to the memory circuit 52 to be used for selecting the analog memory pairs in which the luminance signal $E_B(Y)$ and color difference signals $E_B(R-Y)$ and $E_B(B-Y)$ of the channel B are written or stored for successive fields.

The writing control signals $W_1$, $W_2$ and $W_3$ are applied to AND gates 107, 106 and 105 respectively together with the output a of the RS flip-flop 14, and the outputs of these AND gates 105, 106 and 107 are applied to T flip-flops 108, 109 and 110 respectively. These flip-flops 108, 109 and 110 are reset by the vertical synchronizing signal $V_A$ of the channel A. Thus, when the counter 15 has counted the predetermined number of horizontal scanning lines to set the flip-flop 14, reading control signals $R_1$, $R_2$ and $R_3$ having an output mode of (0, 0, 1), (1, 0, 0) and (0, 1, 0) corresponding to the writing control signals $W_1$, $W_2$ and $W_3$ having the output mode of (1, 0, 0) (0, 1, 0) and (0, 0, 1) appear from the flip-flops 109, 110 and 108 respectively. In the memory circuit 52, the memory pairs have completed storage of the information are sequentially selected in response to the application of the reading control signals $R_1$, $R_2$ and $R_3$, and the information can be read out in response to the application of the reading clock pulse signal e generated when the output a of the flip-flop 14 and the output b of the flip-flop 17 appear simultaneously.

The outputs a and b of the respective flip-flops 14 and 17 are applied to a NAND gate 111 which generates the selection control signal $N_0$ for selecting the signals $E_A(Y)$, $E_A(R-Y)$ and $E_A(B-Y)$ of the channel A. The reading control signals $R_1$, $R_2$ and $R_3$ are applied together with the output b of the flip-flop 17 to AND gates 112, 113 and 114 which generate the selection control signals $N_1$, $N_2$ and $N_3$ respectively for selecting the signals $E_B(Y)$, $E_B(R-Y)$ and $E_B(B-Y)$ of the channel B stored in the corresponding analog memories.

The luminance signal memories in the memory circuit 52 are similar in structure to those in FIG. 2, and the luminance signal is sequentially written in the analog memories determined by the writing control signals $W_1$, $W_2$ and $W_3$ in response to the application of the pulse signals $\phi_{HB}$ and $\phi_{VB}$. After the analog memories have completed the storage of the luminance signal of the successive fields and as determined by the reading control signals $R_1$, $R_2$ and $R_3$, the luminance signal is sequentially read out in response to the application of the pulse signals $\phi_{HA}$ and $\phi_{VA}$.

The color difference signal memories have a structure as shown in FIG. 6. Memory blocks 220, 230 and 240 are the same in structure, and the structure of the memory block 220 only is shown in detail in FIG. 6. The color difference signals $E_B(R-Y)$ and $E_B(B-Y)$ are applied to a horizontal input register 201 from the (R-Y) and (B-Y) demodulators 50 and 51 through the switching circuits 63 and 64 respectively. The color difference signal registered in the horizontal input register 201 is transferred to a vertical register 202 to be converted into a parallel signal in the vertical register 202. The parallel signal is applied from the vertical register 202 to a horizontal output register 203 to be converted into a serial signal in the horizontal output register 203. These registers are similar in structure to those used in the luminance signal memories and constitute an S-P-S analog memory commonly known in the art. An analog shift register 204 is formed together with the register 203 on the same substrate. This register 204 acts to delay the output of the register 203 by one horizontal scanning period and is actuated by the same horizontal transfer clock signal $\phi_{HA}$ as that used for actuating the register 203. Switching circuits 205 to 208 in the memory block 220 are turned on and off under control of the control signals $W_1$ and $R_1$, and switching circuits 209 and 210 are turned on and off under control of the output signal $\phi_{SA}$ of the flip-flop 56. The memory blocks 230 and 240 have the same structure as the memory block 220 composed of the elements 201 to 208, and the color difference signals of successive fields are alternately written in and read out from these memory blocks 220, 230 and 240.

When a writing control signal $W_1$ of a "1" level is applied from the control circuit 73, the switching circuits 205 and 206 are turned on to permit application of the horizontal and vertical transfer clock pulse signals $\phi_{HB}$ and $\phi_{VB}$ to the horizontal register 201 and vertical register 202 from the horizontal clock signal generator 61 and vertical clock signal generator 62 respectively so that field information of the channel B is stored in the memory block 220. The transfer clock pulse signals are, for example, two-phase clock pulse signals. The color difference signals $E_B(R-Y)$ and $E_B(B-Y)$ are applied in the line sequential mode to the horizontal register 201 from the switching circuits 63 and 64 to be stored in the memory block 220 in the line sequential form.

After the completion of the writing operation and during the scanning operation carried out on the screen portion B in FIG. 1 in synchronism with that for the channel A, a reading control signal $R_1$ of a "1" level is applied from the control circuit 73 to turn on the switching circuits 207 and 208, and the horizontal and vertical transfer clock pulse signals $\phi_{HA}$ and $\phi_{VA}$ are applied from the horizontal clock signal generator 53 and vertical clock signal generator 54 to the registers 203, 204 and 202 respectively so as to sequentially read out the color difference signals $E_B(R-Y)$ and $E_B(B-Y)$. Since the frequency of the clock pulse signal $\phi_{HA}$ is two times that of the clock pulse signal $\phi_{HB}$, the time axis of the color difference signals of the channel B is compressed to the half of that of the color difference signals of the channel A.

Due to the fact that the shift register 204 is actuated by the same horizontal transfer clock pulse signal $\phi_{HA}$ as that used for actuating the horizontal register 203, the output of the register 203 representing the color difference signal transferred from the vertical register 202 and the output of the register 204 representing the color difference signal delayed by one horizontal scanning period appear concurrently to be a pair of different input terminals of the switching circuits 209 and 210. These switching circuits 209 and 210 are alternately turned on and off under control of the control signal $\phi_{SA}$ applied from the flip-flop 56 so that the color difference signals $E_B(R-Y)$ and $E_B(B-Y)$ appear concurrently at output terminals 211 and 212 to be applied to the gain control circuits 67 and 68 respectively.

The problem encountered in the color picture display of the subchannel B is the DC level and amplitude of the video signal of the subchannel B relative to those of the video signal of the main channel A. That is, a difference between the DC levels of the two video signals results in a difference in a hue between the colors of the pictures of the two channels, and also, an unbalance between the amplitudes of the two video signals results in a difference between the degrees of color saturation, giving rise to an extreme deterioration of the quality of the reproduced picture of the channel B. In the color television receiver of the present invention which obviates the above problem, the DC levels of the channels A and B are adjusted before the luminance signals and color difference signals of the channels A and B are selected in the signal selecting circuit 72 to provide the color picture signals to be displayed. This is attained by the clamping circuits 69, 70 and 71 for the channel A and by the gain control circuits 66, 67 and 68 for the channel B. Further, in order to attain the desired balance in the relative amplitudes, the amplitudes of the signals $E_B(Y)$, $E_B(R-Y)$ and $E_B(B-Y)$ of the channel B are adjusted in the gain control circuits 66, 67 and 68 respectively. The luminance signals $E(Y)$ and color difference signals $E(R-Y)$ and $E(B-Y)$ of the channels A and B appearing from the signal selecting circuit 72 are processed in a manner similar to the usual manner of signal processing carried out generally in color television receivers to be displayed on the display screen as the color pictures.

The color television receiver according to the present invention is advantageous in that the analog memory capacity can be reduced due to the fact that the color difference signals of each field of the subchannel B are stored in one of the analog memory blocks in a line sequential mode, and the one of the line sequential color difference signals is read out from one of the registers in concurrent relation with the other color difference signal read out from another register which acts as the delay element delaying the signal by one horizontal scanning period. The present invention is also advantageous in that color pictures of high quality can be displayed due to the fact that the luminance signal and color difference signals of each channel are adjusted in their DC level and balanced in their amplitude before being combined together to provide the video signal.

The aforementioned embodiment of the present invention has been described with reference to the example in which the picture of the subchannel B occupying an area which is about the quarter of the total screen area is displayed at the lower right corner portion of the screen of the color television receiver displaying the picture of the main channel A, as shown in FIG. 1. However, the area occupied by the subchannel B can be varied as desired by, for example, varying the capacity of the counters 15 and 16 or replacing the flip-flop 12 by a counter having a suitable capacity. The display position of the subchannel B is in no way limited to the lower right corner portion illustrated in FIG. 1 and may be any one of the upper right corner portion, upper left corner portion and lower left corner portion of the screen. Further, the relation between the channels A and B on the display screen can be simply reversed by switching the outputs of the circuit blocks 41 and 42 by any suitable means such as a switch.

We claim:

1. A color television receiver including means for receiving a first television signal and a second television signal of different channels, means for writing the second television signal in a memory means, means for reading out the second television signal from said memory means in the form of a television signal compressed in its time axis, and means for inserting said compressed second television signal in a portion of the first television signal to simultaneously display the pictures of the two channels on the same display screen, said receiver comprising:

means for deriving a first corresponding luminance signal and a second corresponding luminance signal from said first and second television signals respectively;

means for deriving a first corresponding chrominance signal and a second corresponding chrominance signal from said first and second television signals respectively;

means for demodulating said first and second chrominance signals;

means for separating a first corresponding synchronizing signal and a second corresponding synchronizing signal from said first and second television signals respectively;

means responsive to said second synchronizing signal for generating a writing clock pulse signal for signal writing said memory means;

means responsive to said first synchronizing signal for generating a reading clock pulse signal for signal reading from said memory means, the frequency of said reading clock pulse signal being higher than that of said writing clock pulse signal;

means for separately writing said second luminance signal and said demodulated second chrominance signal in said memory means in response to the application of said writing clock pulse signal;

means for reading out said second luminance signal and said second chrominance signal from said memory means in a relation compressed in the time axis in response to the application of said reading clock pulse signal;

means for adjusting the signal levels of said demodulated first chrominance signal and said demodulated compressed second chrominance signal to maintain a predetermined relationship therebetween; and signal selecting means for replacing a portion of said first luminance signal and said first chrominance signal by said second luminance signal and said second chrominance signal read out from said memory means.

2. A color television receiver as claimed in claim 1, wherein said demodulated first and second chrominance signals are a plurality of color difference signals respectively.

3. A color television receiver as claimed in claim 1 or 2, wherein said writing means includes means for converting said second chrominance signal into line sequential signals so as to store said second chrominance signal in said memory means in a line sequential mode.

4. A color television receiver as claimed in claim 3, wherein said reading means includes signal delay means for delaying said second chrominance signal by one horizontal scanning period so that one of the color difference signals in said second chrominance signal written in the line sequential mode and the delayed color difference signal in said second chrominance signal can be concurrently read out from said memory means.

5. A color television receiver as claimed in claim 1, wherein said adjusting means further includes circuit means for adjusting the relative signal level of said first luminance signal and said compressed second luminance signal to maintain a predetermined relationship therebetween.

6. A color television receiver including means for receiving a first television signal and a second television signal of different channels, means for writing the second television signal in a memory means, means for reading out the second television signal from said memory means, in the form of a television signal compressed in its time axis, and means for inserting said compressed second television signal in a portion of the first television signal to display the pictures of the two channels on the same display screen, said receiver comprising:

first and second circuit means for deriving a first luminance signal and a second luminance signal from said first and second television signals respectively;

first and second chrominance signals deriving means for deriving a first chrominance signal and a second chrominance signal from said first and second television signals respectively;

first and second demodulating means for demodulating first and second chrominance signals;

synchronizing signal separating means for separating a first synchronizing signal and a second synchronizing signal from said first and second television signals respectively;

means responsive to said second synchronizing signal for generating a writing clock pulse signal for signal writing in said memory means;

means responsive to said first synchronizing signal for generating a reading clock pulse signal for signal reading from said memory means, the frequency of said reading clock pulse signal being higher than that of said writing clock pulse signal;

means responsive to said writing clock pulse signal for writing said second luminance and said demodulated second chrominance signal in a first memory and a second memory respectively in said memory means;

means responsive to said reading clock pulse signal for reading out said second luminance signal and said second chrominance signal, in a relation compressed in the time axis, from said first and second memories respectively in said memory means;

circuit means for adjusting the signal levels of said first luminance signal and said first chrominance signal in said first television signal relative to said second luminance signal and said second chrominance signal in said second television signal read out from said memory means to maintain a predetermined relationship therebetween; and signal selecting means for replacing a portion of said first luminance signal and said first chrominance signal by said second luminance signal and said second chrominance signal read out from said memory means.

7. A color television receiver as claimed in claim 6, wherein said demodulated first and second chrominance signals are each color difference signals representing the two color differences (R-Y) and (B-Y), said writing means writes said second chrominance signal in said second memory in a line sequential mode, and said reading means includes signal delay means for delaying said second chrominance signal by one horizontal scanning period so that one of the color difference signals in said second chrominance signal written in the line sequential mode and the delayed color difference signal in said second chrominance signal can be concurrently read out from said memory means.

8. A color television receiver as claimed in claim 6, wherein said signal level adjusting means is connected between said memory means and said signal selecting means and adjusts the signal levels of said second luminance signal and said second chrominance signal read out from said memory means to maintain the signal levels in a predetermined relationship relative to those of said first luminance signal and said first chrominance signal.

9. A color television receiver including means for receiving a first television signal and a second television signal of different channels, means for writing the second television signal in a memory means, means for reading out the second television signal from said memory means in the form of a television signal compressed in its time axis, and means for inserting said compressed second television signal in a portion of the first television signal to simultaneously display the pictures of the two channels on the same display screen, said receiver comprising:

- means for deriving a first corresponding luminance signal and a second corresponding luminance signal from said first and second television signals respectively;
- means for deriving a first corresponding chrominance signal and a second corresponding chrominance signal from said first and second television signals respectively;
- means for demodulating said first and second chrominance signals;
- means for separating a first corresponding synchronizing signal and a second corresponding synchronizing signal from said first and second television signals respectively;
- means responsive to said second synchronizing signal for generating a writing clock pulse signal for signal writing said memory means;
- means responsive to said first synchronizing signal for generating a reading clock pulse signal for signal reading from said memory means, the frequency of said reading clock pulse signal being higher than that of said writing clock pulse signal;
- means for separately writing said second luminance signal and said demodulated second chrominance signal in said memory means in response to the application of said writing clock pulse signal;
- means for reading out said second luminance signal and said second chrominance signal from said memory means in a relation compressed in the time axis in response to the application of said reading clock pulse signal; and
- signal selecting means for replacing a portion of said first luminance signal from said first chrominance signal by said second luminance signal and said second chrominance signal read out from said memory means.

* * * * *